US012650820B2

(12) United States Patent
Robinson et al.

(10) Patent No.: US 12,650,820 B2
(45) Date of Patent: Jun. 9, 2026

(54) SYSTEMS AND METHODS FOR ACTION LOGS

(71) Applicant: Palantir Technologies Inc., Denver, CO (US)

(72) Inventors: Eugene Robinson, London (GB); Vidit Gupta, London (GB); Daniel Burke, New York, NY (US); Alexander Hill, New York, NY (US); Andy Boscor, Denver, CO (US); Andy Chen, New York, NY (US); Bianca Rahill-Marier, New York, NY (US); Charles Perinet, London (GB)

(73) Assignee: Palantir Technologies Inc., Aventura, FL (US)

( * ) Notice: Subject to any disclaimer, the term of this patent is extended or adjusted under 35 U.S.C. 154(b) by 338 days.

(21) Appl. No.: 18/114,004

(22) Filed: Feb. 24, 2023

(65) Prior Publication Data

US 2023/0273774 A1      Aug. 31, 2023

Related U.S. Application Data

(60) Provisional application No. 63/314,854, filed on Feb. 28, 2022, provisional application No. 63/389,480, filed on Jul. 15, 2022.

(51) Int. Cl.
| | |
|---|---|
| *G06F 9/44* | (2018.01) |
| *G06F 8/35* | (2018.01) |
| | (Continued) |

(52) U.S. Cl.
CPC . *G06F 8/35* (2013.01); *G06F 8/71* (2013.01)

(58) Field of Classification Search
CPC ..... G06F 8/35; G06F 8/70; G06F 8/71; G06F 11/302; G06F 11/3476
See application file for complete search history.

(56) References Cited

U.S. PATENT DOCUMENTS

| | | | |
|---|---|---|---|
| 6,640,231 | B1 | 10/2003 | Andersen |
| 7,343,364 | B2 | 3/2008 | Bram |
| | | (Continued) | |

FOREIGN PATENT DOCUMENTS

| | | | | |
|---|---|---|---|---|
| CN | 114116159 A | * | 3/2022 | ........... G06F 18/241 |
| EP | 3671459 B1 | * | 9/2021 | .......... G06F 11/0751 |
| | | (Continued) | | |

OTHER PUBLICATIONS

Federica Paganell, A RESTful Rule Management Framework for Internet of Things Applications, 2020, pp. 1-15. https://ieeexplore.ieee.org/stamp/stamp.jsp?tp=&arnumber=9273004 (Year: 2020).*

(Continued)

*Primary Examiner* — Mongbao Nguyen
(74) *Attorney, Agent, or Firm* — Faegre Drinker Biddle & Reath LLP

(57) ABSTRACT

Systems and methods for validations related to software are provided. In some embodiments, a method for building software with software action logging includes accessing a target object type. In some embodiments, the target object type includes one or more object properties. In some embodiments, the method further includes accessing an action type. In some embodiments, the action type includes one or more action parameters and is associated with one or more action rules. In some embodiments, the action type is associated with editing a target object of the target object type. In some embodiments, the method further includes generating an action log type that includes at least one of the one or more object properties and at least one of the one or more action parameters. In some embodiments, the action log type further includes an action context associated with an action of the action type.

18 Claims, 9 Drawing Sheets

(51) Int. Cl.

| | |
|---|---|
| *G06F 8/71* | (2018.01) |
| *G06F 9/445* | (2018.01) |
| *G06F 9/45* | (2006.01) |
| *G06F 9/455* | (2018.01) |

(56) References Cited

U.S. PATENT DOCUMENTS

| | | | | |
|---|---|---|---|---|
| 7,707,189 | B2 | 4/2010 | Haselden et al. | |
| 8,739,150 | B2 | 5/2014 | Gass | |
| 10,963,465 | B1 * | 3/2021 | Jones | G06F 16/2456 |
| 11,068,373 | B1 * | 7/2021 | Meurer | G06F 16/338 |
| 11,726,760 | B2 | 8/2023 | Gass | |
| 12,353,852 | B2 | 7/2025 | Hill et al. | |
| 2019/0026163 | A1 | 1/2019 | Subbiah et al. | |
| 2020/0349130 | A1 | 11/2020 | Bracholdt | |
| 2021/0191718 | A1 * | 6/2021 | Draude | G06F 8/77 |
| 2021/0303441 | A1 | 9/2021 | Hazra et al. | |
| 2021/0365410 | A1 * | 11/2021 | Bonfiglio | G06F 16/178 |
| 2021/0382709 | A1 * | 12/2021 | Sagal | G06F 8/71 |
| 2022/0058000 | A1 * | 2/2022 | Iley | G06F 8/71 |
| 2022/0107802 | A1 * | 4/2022 | Rao | G06F 16/907 |
| 2022/0300268 | A1 * | 9/2022 | Satheesh | G06F 8/71 |
| 2022/0309418 | A1 * | 9/2022 | Chivukula | G06F 8/71 |
| 2022/0350866 | A1 * | 11/2022 | Chauhan | G06F 21/554 |
| 2023/0072084 | A1 * | 3/2023 | Kakhandiki | G06F 11/3438 |
| 2023/0123086 | A1 * | 4/2023 | Hofman | G06F 3/0482 715/765 |
| 2023/0125754 | A1 * | 4/2023 | Willett | H04L 63/105 717/102 |
| 2023/0244474 | A1 * | 8/2023 | Shmidov | G06F 8/70 717/120 |
| 2023/0244686 | A1 * | 8/2023 | Laraki | G06F 16/23 707/602 |
| 2023/0273800 | A1 | 8/2023 | Hill et al. | |
| 2024/0061678 | A1 * | 2/2024 | Singh | G06F 8/10 |

FOREIGN PATENT DOCUMENTS

| | | | | |
|---|---|---|---|---|
| EP | 4242836 | A1 | 9/2023 | |
| WO | WO-2018226895 | A2 * | 12/2018 | G06F 11/368 |

OTHER PUBLICATIONS

English translation (EP 3671459 B1), 2021, pp. 1-15. (Year: 2021).*

English translation (WO 2018226895 A2), 2018, pp. 1-123. (Year: 2018).*

Matthew A. Puentes, Visualizing Web Application Execution Logs to Improve Software Security Defect Localization, 2022, pp. 1-8. https://ieeexplore.ieee.org/stamp/stamp.jsp?tp=&amnumber=9825829 (Year: 2022).*

Sjoblom et al., "Towards the Desired Experience for Custom Applications in Analytical Software," 2021 [Retrieved on Jan. 23, 2025, from the internet: <URL: https://odr.chalmers.se/items/7af5f329-1035-4383-b0e4-7ff6ef359ba4> 163 pages].

United States Patent and Trademark Office, Notice of Allowance mailed Mar. 12, 2025, in U.S. Appl. No. 18/113,719.

United States Patent and Trademark Office, Office Action mailed Sep. 20, 2024, in U.S. Appl. No. 18/113,719.

European Patent Office, Extended European Search Report mailed Aug. 10, 2023, in EP 23158532.4.

* cited by examiner

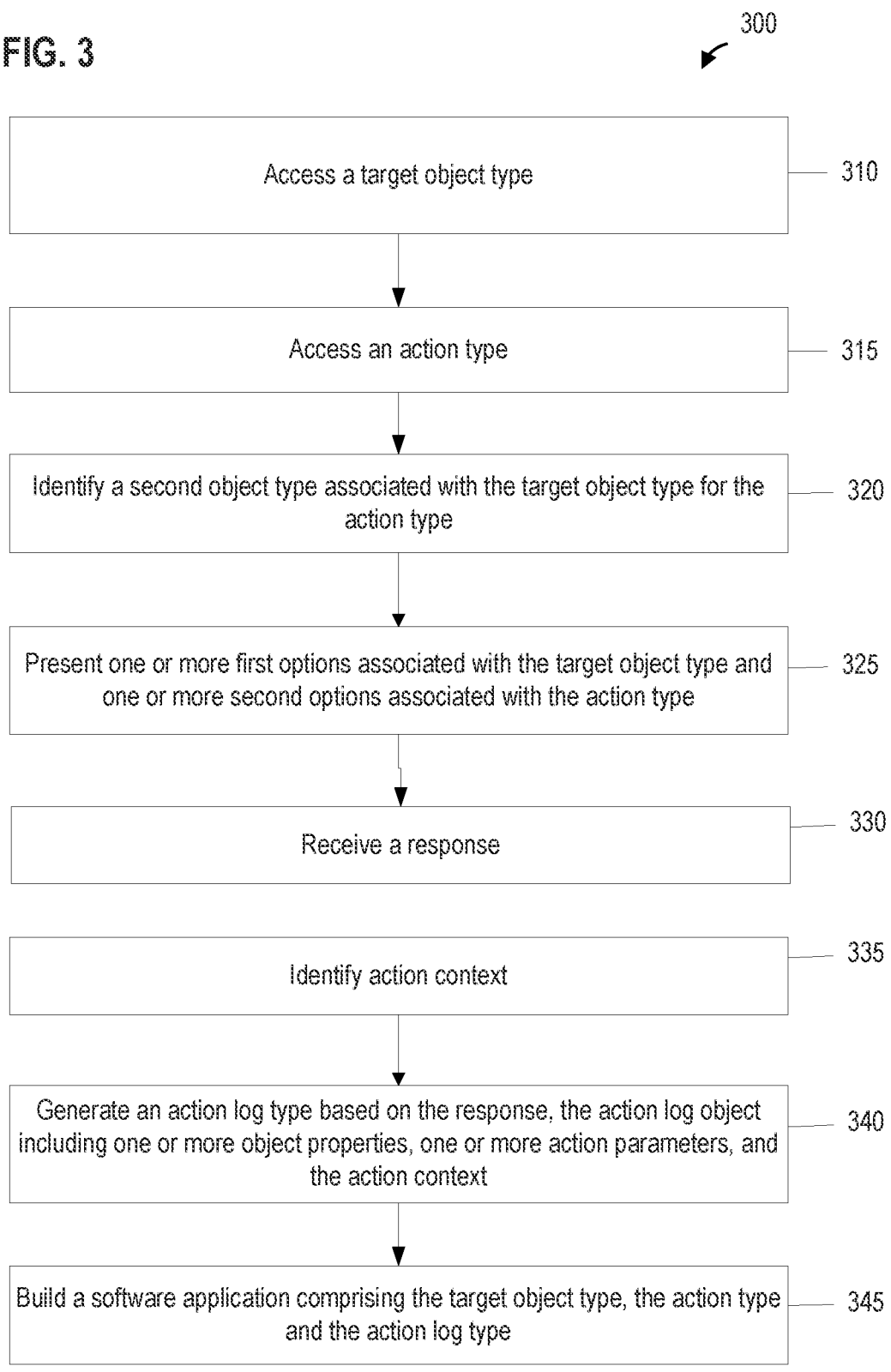

Access a target object type — 310

Access an action type — 315

Identify a second object type associated with the target object type for the action type — 320

Present one or more first options associated with the target object type and one or more second options associated with the action type — 325

Receive a response — 330

Identify action context — 335

Generate an action log type based on the response, the action log object including one or more object properties, one or more action parameters, and the action context — 340

Build a software application comprising the target object type, the action type and the action log type — 345

500

600

Access a target object of a target object type — 610

Receive data associated with an action of an action type — 615

Collect one or more action contexts associated with the action — 620

Generate an action log of an action log type for the action, the action log including the action context — 625

Generate a log report based on one or more action logs of one or more action log types — 630

SYSTEMS AND METHODS FOR ACTION LOGS

CROSS REFERENCE TO RELATED APPLICATIONS

This application claims priority to U.S. Provisional Application No. 63/314,854 filed Feb. 28, 2022, and U.S. Provisional Application No. 63/389,480 filed Jul. 15, 2022, both incorporated by reference herein for all purposes.

TECHNICAL FIELD

Certain embodiments of the present disclosure are directed to systems and methods for software logging. More specifically, some embodiments of the present disclosure relate to systems and methods for logging related to software actions applicable to objects.

BACKGROUND

Many enterprises and organizations use software and software systems to operate their technical systems. In some examples, the organizations need logging regarding the operations implemented using the software systems.

Hence it is desirable to improve the techniques for software logging.

SUMMARY

Certain embodiments of the present disclosure are directed to systems and methods for software logging. More specifically, some embodiments of the present disclosure relate to systems and methods for logging related to software actions applicable to objects.

At least some aspects of the present disclosure are directed to methods for building software with software action logging. In certain embodiments, a method comprises: accessing a target object type, the target object type comprising one or more object properties; accessing an action type, the action type comprising one or more action parameters and associated with one or more action rules, the action type associated with editing a target object of the target object type; generating an action log type comprising at least one of the one or more object properties and at least one of the one or more action parameters, the action log type further comprising an action context associated with an action of the action type, the action context comprising information associated with at least one selected from a group consisting of a second object type, a first state of the target object before the action is taken, a second state of the target object after the action is taken, metadata associated with the action, and one action rule of the one or more action rules, wherein the second object type is different from the target object type; and building a software application, wherein the software application comprises the target object type, the action type, and the action log type; wherein the method is performed using one or more processors.

In certain embodiments, a method for software action logging, the method comprises: accessing a target object of a target object type, the target object type comprising one or more object properties; receiving data associated with an action of an action type, the action type comprising one or more action parameters and associated with one or more action rules, the action type associated with editing a target object of the target object type; and generating an action log of an action log type, the action log type comprising at least one of the one or more object properties and at least one of the one or more action parameters, the action log type further comprising an action context associated with an action of the action type, the action context comprising information associated with at least one selected from a group consisting of a second object type, a state of the target object before the action is taken, a second state of the target object after the action is taken, metadata associated with the action, and one action rule of the one or more action rules, wherein the second object type is different from the target object type; wherein the method is performed using one or more processors.

In some embodiments, a system for software action logging, the system comprising: one or more memories having instructions stored thereon; one or more processors configured to execute the instructions and perform operations comprising: accessing a target object of a target object type, the target object type comprising one or more object properties; receiving data associated with an action of an action type, the action type comprising one or more action parameters and associated with one or more action rules, the action type associated with editing a target object of the target object type; and generating an action log of an action log type, the action log type comprising at least one of the one or more object properties and at least one of the one or more action parameters, the action log type further comprising an action context associated with an action of the action type, the action context comprising information associated with at least one selected from a group consisting of a second object type, a state of the target object before the action is taken, a second state of the target object after the action is taken, metadata associated with the action, and one action rule of the one or more action rules, wherein the second object type is different from the target object type.

Embodiments of this disclosure may be employed, for example, in flight operation computer systems which are commonly employed to operate airports or airlines. This field of application is explained in more detail below. Another field of application for embodiments of the present disclosure is a software that allows to monitor a plant tree project which will be explained in more detail below. A technical effect which can for example be achieved by embodiments of the present disclosure, not only the examples given above, is that context of an action can be logged in an efficient manner (e.g. reducing memory use and/or energy use), for example, by linking the action log to objects of context, instead of including all data fields of objects of context in the action log.

BRIEF DESCRIPTION OF THE DRAWINGS

The accompanying drawings are incorporated in and constitute a part of this specification and, together with the description, explain the features and principles of the disclosed embodiments. In the drawings.

FIG. 3 is a simplified diagram showing a method for building an application with action logs according to certain embodiments of the present disclosure;

DETAILED DESCRIPTION

Figure 1:
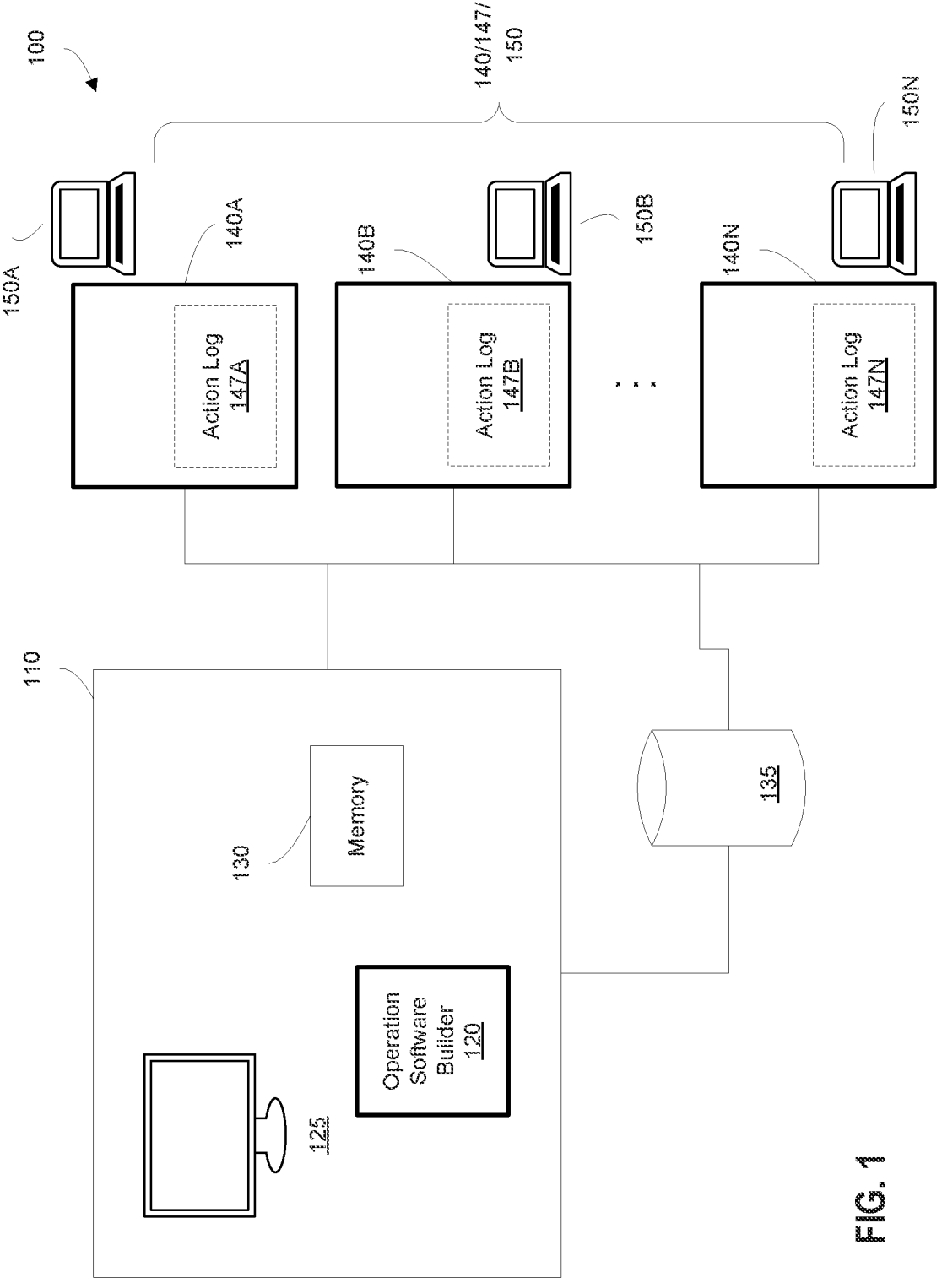
FIG. 1 depicts an illustrative diagram of an operation software environment, in accordance with certain embodiments of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information.

In computing, logging is the act of generating and storing to memory a log of events that occur in a computer system, such as problems, errors or just information on current operations. These events may occur in the operating system or in other software. A message or log entry may be generated and stored for each such event. From a security point of view, an example purpose of a log is to act as a red flag when something unexpected, erroneous and/or malevolent is happening. Reviewing logs regularly, whether performed manually or automatically by software may help identify malicious attacks or errors on the computer system. At least some embodiments of the present disclosure are directed to generating one or more records (e.g., a record of decisions) for analysis within an object relational data model. In certain embodiments, the system includes the option for users to configure a custom log of events, e.g. decisions, to incorporate into an existing object relational data model, for example, for the purpose of analyzing and improving one or more processes . In some embodiments, emitting logs (e.g., generating log reports) is a practice in software products, but the capacity to customize these logs such that they communicate both data model changes and logic is uncommon. In some embodiments, the logs are available within an object relational data model.

In certain embodiments, the system includes configuring the aforementioned record of events, for example, in order to optimize logging and analysis with target metrics. In some embodiments, the logging systems and methods can broadly support event analysis. In certain embodiments, the systems and methods can improve the conventional logging approach of irregularly configured records for events. In some embodiments, the logging systems and methods can be used in a deployment of software that yields changes to a data model or recorded events. In certain embodiments, a data model includes an object type of data structure, an action type of data structure, and an action log type of data structure. In some embodiments, an action log type is an object type.

In some embodiments, log objects can be used in an application building process. In certain embodiments, an application builder directly connects application assets (e.g., application components, frontend components) to objects and links in an ontology. As used herein, an ontology refers to a structural framework (e.g., data model) containing information and data related to objects and relationships of objects (e.g., functions applicable to objects, links) within a specific domain (e.g., an organization, an industry). In some embodiments, an application includes one or more actions taken on one or more objects or among objects. As used herein, an action refers to one or more processing logics applied to one or more objects including, for example, creating objects, changing objects, combining objects, linking objects, deleting objects, and/or the like.

According to certain embodiments, without exposing action logs, a decision software (e.g., a decision suite) may fall short of its promise to help organizations or technical systems, e.g. automated technical systems, interrogate and improve their decision making. A conventional approach relies on queries to track action edits to the organization or technical system's ontology data. In some examples, no action log is exposed to users. In some embodiments, some embodiments of the present disclosure enable one or more of the following: 1) integrate an action log type, also referred to as an action log object, with an action type; 2) capture context for actions; and 3) capture workflow context for actions, where the workflow context may not be exposed to users. As used herein, an action type is a data structure of an action, which creates or modifies one or more objects of one or more object types when the action occurs. In certain embodiments, an action can be represented by an instance of the action type, where the instance of the action type comprises data associated with the action occurring and using the action type data structure. As used herein, an object type is a data structure representing a type of an object, where the data structure includes one or more object properties. In some examples, an object (e.g., plane A) is an instance of an object type (e.g., plane object type).

In some embodiments, the systems and methods for action logs can track the intersecting impacts of ontology edits, which enrich database queries and edits with business and workflow context, e.g. technical workflow context, while reducing the effort required to build action logs (e.g., decision objects). In certain embodiments, an action log (e.g., a decision object) may be used to capture a decision, where a decision is a change to an object or adding an object by taking one or more actions. In some embodiments, some actions do not touch objects and may invoke an application or an application call, for example, writing to a different software system and/or a different software application.

FIG. 1 depicts an illustrative diagram of an operation software environment 100, in accordance with certain embodiments of the present disclosure. FIG. 1 is merely an example. One of ordinary skill in the art would recognize many variations, alternatives, and modifications. According to certain embodiments, the operation software environment 100 includes an operation software design system 110, ontology data depository 135, and operation software 140 on user devices 150. According to some embodiments, the operation software design system 110 includes an operation software builder 120, a user interface 125 and one or more memories 130. Although the above has been shown using a selected group of components in the operation software environment 100, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present disclosure.

According to some embodiments, the operation software design system 110 and/or the operation software builder 120 is configured to receive inputs and present options via the user interface 125 to one or more users. In certain embodiments, the operation software design system 110 and/or the operation software builder 120 is configured to access an action type and one or more object types. In certain embodiments, the action type represents a type of action to be applied to one or more objects of the one or more object types, such as create, modify, and/or delete the one or more objects, also referred to as target objects. In some embodiments, each object is of an object type including one or more object properties. In certain embodiments, the operation software design system 110 and/or the operation software builder 120 is configured to add or change one or more object properties of the object. In some embodiments, the operation software design system 110 and/or the operation software builder 120 is configured to link an action of the action type to one or more objects. In certain embodiments, an action being taken is configured to modify a property of an object.

According to certain embodiments, the operation software design system 110 and/or the operation software builder 120 is configured to include a user interface design to configure how one or more object types and associated one or more object properties, one or more action types and one or more action parameters can be presented on a user interface rendered by an operation software 140. In response to inputs received at the user interface 125, the operation software design system 110 and/or the operation software builder 120 is configured to generate one or more action log objects (e.g., action log types, software objects).

According to some embodiments, using the user interface 125, the system includes a configuration of action log types. In certain embodiments, the operation software design system 110 populates the configuration interface with one or more action types and associated one or more action parameters, one or more object types and associated one or more object properties, one or more objects and one or more additional properties associated with the designed action. In some embodiments, the configuration of action log types allows a user to select the data to be logged associated with the designed action. In certain embodiments, one or more action logs, which are instances of action log types, include or link to one or more objects. In some embodiments, one or more action logs include or link to one or more actions. As mentioned above, this allows to enable the technical effect of efficient memory use since the one or more actions do not have to be included in the one or more action logs. This may also use less energy (electrical). A link may refer to a hyperlink or similar, enabling access to a relevant one or more objects and one or more actions only in response to a selection (whether manual or automated) of the associated link. In certain embodiments, one or more action log types include one or more object properties. In some embodiments, one or more action log types include to one or more action parameters.

According to certain embodiments, the operation software design system 110 and/or the operation software builder 120 is configured to design the action log types depending on a role of a user using the user device 150. In some embodiments, the operation software design system 110 and/or the operation software builder 120 is configured to deploy or allow installations of application software 140 (e.g., application software 140A, application software 140B, . . . , application software 140N) onto respective user devices 150 (e.g., user device 150A, user device 150B, . . . , user device 150N).

According to some embodiments, the operation software 140 is configured to generate the one or more action logs 147, each action log 147 of the one or more action logs 147 includes or links to one or more objects of the one or more object types, for example, to provide log content. As mentioned above, this allows to enable the technical effect of an efficient memory use and/or less energy use. In some embodiments, the operation software 140 is configured to log one or more actions of the one or more action types to generate action logs 147. In certain embodiments, an object is associated with is a history of action logs (e.g., decisions made on the object). In some embodiments, an action log 147 is generated (e.g., instantiated) based on an action log type that includes one or more selected object properties of a target object type and one or more selected action parameters of an action type. In certain embodiments, the operation software 140 is configured to load a target object of the target object type, and receive an action of an action type conducted on the target object. In some embodiments, the operation software 140 is configured to record the action context (e.g., workflow context) associated with the action type in the action log 147.

According to some embodiments, one or more action contexts are associated with an action type. In some embodiments, two or more action contexts are associated with an action type. In certain embodiments, two or more action contexts are associated with an action type depending on an object type of the object associated with the action of the action type. According to certain embodiments, an action context includes a decision context associated with the decision (e.g., action time, related object) and a workflow context that is hidden from the user. In some embodiments, the action context includes one or more comments.

According to certain embodiments, the operation software 140 includes a first action context associated with the action type, a first object type and/or a first object of the first object type. In certain embodiments, the operation software 140 includes a second action context associated with the action type, a second object type and/or a second object of the second object type. In some embodiments, the operation software 140 includes a first action log type associated with the action type, where the first action log type includes the first action context. In some embodiments, the operation software 140 includes a second action log type associated with the action type, where the second action log type includes the second action context.

In certain embodiments, the action type is associated with editing an object (e.g., a target object) of the object type. In some embodiments, editing an object of an object type includes creating the target object of the target object type, modifying one or more object properties of the target object of the target object type, and/or deleting the target object of the target object type. In some embodiments, the target object type is associated with a second object type in the context of the action type. For example, a flight object type is associated with an airport object type in a first context of delay-flight action type. In certain embodiments, the first action log type includes one or more properties of the target object type, one or more properties of the second object type, and one or more action parameters of action type. In some embodiments, a first action log (e.g., a log of the flight delay 1) generated from the first action log type is linked to a target object (e.g., flight 123) of the target object type and a second object (e.g., airport A) of the second object type. In certain embodiments, a link to an object is an object identifier (ID) identifying the object. In some embodiments, the link to the object in the action log maintains the link to the object (e.g., object ID, record ID, etc.) even if the object data structure has changed. As mentioned above, this allows to enable the technical effect of an efficient memory use.

In some embodiments, the second object is associated with the second object type and a third object type in a second context of the action type. For example, a flight object type is associated with an airport object type and a weather object type in the context of delay-flight action type. In certain embodiments, the second action log type includes one or more properties of the target object type, one or more properties of the second object type, one or more properties of the third object type, and one or more action parameters of action type. In some embodiments, a second action log (e.g., a log of the flight delay 2) generated from the second action log type is linked to a target object (e.g., flight 123) of the target object type, a second object (e.g., airport A) of the second object type, and a third object (e.g., weather of the airport A at XX time) of the third object type. As mentioned above, this allows to enable the technical effect of an efficient memory use.

According to some embodiments, the action context includes a first state (e.g., an instance of the target object, flight object A including depart time X) of the target object before the action is taken. In some examples, the action context includes a second state (e.g., an instance of the target object, flight object A including depart time Y) of the target object after the action is taken. In certain examples, the action context includes metadata associated with the action. In some embodiments, the action type includes or is associated with one or more action rules (e.g., permission, permissible range, etc.), also referred to as action validation rules or validation rules. In some examples, the action context includes at least one action rule of the one or more action rules.

According to certain embodiments, the operation software 140 is configured to send the action logs 147 to a data repository (e.g., a local data repository on a user device 150 in FIG. 1, the data repository 135 in FIG. 1). In some embodiments, the action logs 147 are configured to be uploaded to a data repository (e.g., the data repository 135 in FIG. 1), for example, via a software service, a data synchronization process.

According to some embodiments, the action log 147 can be analyzed via different software and/or via different users, where each software or user is associated with a respective access level and/or access role. In some embodiments, the action log 147 can be retrieved with some data rows and/or data fields hidden depending on the access level and/or data roles, for example, as data reports. In certain embodiments, the access level includes a high access level, a middle access level, and a low access level, where the action log 147 includes all data fields when accessed at the high access level, the action log 147 includes a first subset of data fields when accessed at the middle access level, and the action log 147 includes a second subset of data fields when accessed at the low access level, where the first subset of data fields is larger than the second subset of data fields. In certain examples, at least one data field (e.g., location) is included in the first subset of data fields and not in the second subset of data fields. In some embodiments, the access role includes a plurality of roles (e.g., auditor role, analyst role, operator role).

In certain embodiments, the action log 147 includes a first subset of data rows when accessed at a first role (e.g., analyst role) and the action log 147 includes a second subset of data rows when accessed at a second role (e.g., auditor role), where the first subset of data rows is larger than the second subset of data rows. In some examples, at least one data row is included in the first subset of data rows and not in the second subset of data rows. In certain embodiments, the action log 147 includes a first subset of data when accessed at a first role (e.g., analyst role) and the action log 147 includes a second subset of data when accessed at a second role (e.g., auditor role). In some examples, the first subset of data includes more data fields than the data fields in the second subset of data and the first subset of data and the first subset of data includes more data rows than the data rows in the second subset of data. In certain examples, the first subset of data includes less data fields than the data fields in the second subset of data and the first subset of data and the first subset of data includes more data rows than the data rows in the second subset of data.

In some embodiments, a reason of the action can be inferred based on analyzing the action log 147. In certain embodiments, a reason of the action can come from objects and object properties (e.g., variables) not modified by the action. For example, a reason of the delay-flight action can be the weather associated with the flight. As an example, a reason of the delay-flight action can be a property (e.g., a condition, a variable) of the airport associated with the flight. In some embodiments, the one or more action logs are instantiated at a first time and the linked one or more objects are changed at a second time, where the one or more action logs include the links to the one or more objects. In certain embodiments, the one or more action logs include snapshots associated a state (e.g., one or more object properties data) of the linked one or more objects when the action is taken. As mentioned above, this allows to enable the technical effect of an efficient memory use.

In some embodiments, the ontology data repository 135 and/or the application repository on a user device 150 can include object data, action data, one or more action logs, one or more user data, and/or the like. The ontology data repository 135 and/or the application repository may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the operation software environment 100 can execute software or firmware stored in non-transitory computer-readable medium to implement various processing steps. Various components and processors of the operation software environment 100 can be implemented by one or more computing devices, including but not limited to, circuits, a computer, a cloud-based processing unit, a processor, a processing unit, a microprocessor, a mobile computing device, and/or a tablet computer. In some cases, various components of the operation software environment 100 (e.g., the operation software design system 110, the operation software builder 120, the user devices 150) can be implemented on a shared computing device. Alternatively, a component of the operation software environment 100 can be implemented on multiple computing devices. In some implementations, various modules and components of the operation software environment 100 can be implemented as software, hardware, firmware, or a combination thereof In some cases, various components of the operation software environment 100 can be implemented in software or firmware executed by a computing device.

Various components of the operation software environment 100 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 2:
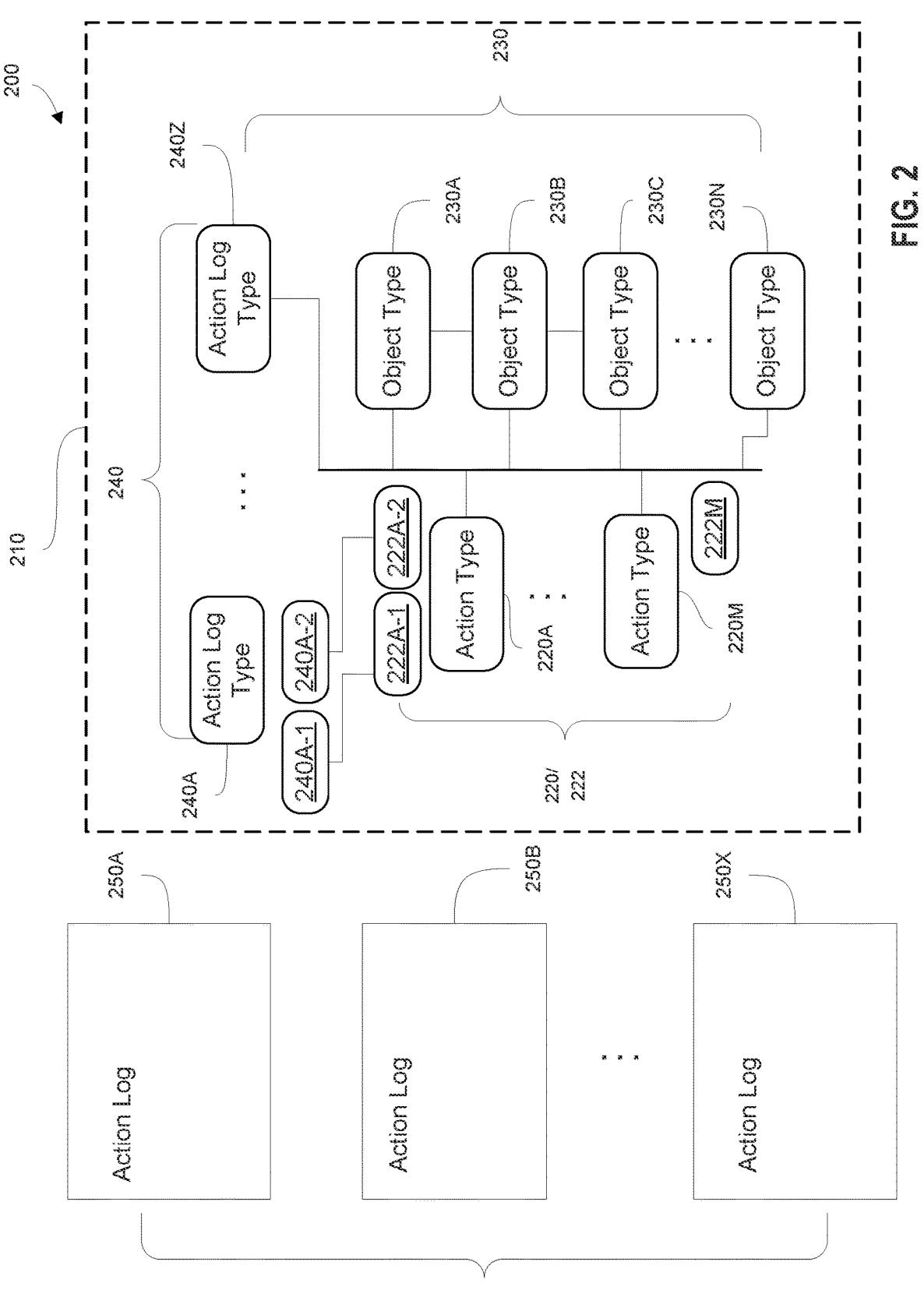
FIG. 2 is an illustrative example of an operation software environment with action logging capability, according to certain embodiments of the present disclosure.

FIG. 2 is an illustrative example of an operation software environment 200 with action logging capability, according to certain embodiments of the present disclosure. In some embodiments, the operation software environment includes an operation software 210 (e.g., a software module, an application, etc.), implemented on a user device (e.g., user device 150 in FIG. 1) configured to generate one or more action logs 250 (e.g., action log 250A, action log 250B, . . . , action log 250X. In certain embodiments, the operation software 210 includes one or more object types 230 (e.g., object type 230, object type 230B, . . . , object type 230N), one or more action types 220 (e.g., action type 220A, . . . , action type 220N), and one or more action log types 240 (e.g., action log type 240A, . . . , action log type 240Z). In some embodiments, each action log 250 of the one or more action logs 250 includes one or more instances of an action log type 240.

According to certain embodiments, the operation software 210 is configured to generate the one or more action logs 250, each action log 250 of the one or more action logs 250 is linked to one or more objects of the one or more object types 230, for example, to provide log content. In some embodiments, the operation software 210 is configured to log one or more actions of the one or more action types 220 to generate action logs 250. In certain embodiments, an object is associated with is a history of action logs (e.g., decisions made on the object). In some embodiments, the action log type 240 includes one or more selected object properties of a target object type and one or more selected action parameters of an action type. In certain embodiments, the action log type 240 is configurable via a user interface (e.g., the user interface 125 in FIG. 1). In certain embodiments, the operation software 210 is configured to load a target object of the target object type, and receive an action of an action type conducted on the target object. In some embodiments, the operation software 210 is configured to record the action context 222 associated with the action type 220 in the action log 250.

According to some embodiments, one or more action context(s) 222 (e.g., action context 222A-1 and/or 222A-2, . . . , action context 222M) is or are associated with an action type 220. In some embodiments, two or more action contexts 222 are associated with an action type 220. In certain embodiments, two or more action contexts 222 are associated with an action type 220 depending on an object type 230 of the object associated with the action of the action type 220. According to certain embodiments, an action context 222 includes a decision context associated with the decision (e.g., action time, related object) and a workflow context that is hidden from the user. In some embodiments, the action context 222 includes one or more comments.

According to certain embodiments, the operation software 210 includes a first action context 222A-1 associated with the action type 220A, a first object type and/or a first object of the first object type. In certain embodiments, the operation software 210 includes a second action context 222A-2 associated with the action type 220A, a second object type and/or a second object of the second object type. In some embodiments, the operation software 210 includes a first action log type 240A-1 associated with the action type 220A, where the first action log type 240A-1 includes the first action context 222A-1. In some embodiments, the operation software 210 includes a second action log type 240A-2 associated with the action type 220A, where the second action log type 240A-2 includes the second action context 222A-2. In certain embodiments, the first action log type 240A-1 is the same as the second action log type 240A-2. In some embodiments, the first action log type 240A-1 is different from the second action log type 240A-2. In certain embodiments, the second action context 222A-2 is different from the first action context 222A-1.

In certain embodiments, the action type 220A is associated with editing an object (e.g., a target object) of the object type 230A. In some embodiments, editing an object of an object type includes creating the object of the object type, modifying one or more object properties of the object of the object type, and deleting the object of the object type. In some embodiments, the object type 230A is associated with the object type 230B in the context of the action type 220A. For example, a flight object type is associated with an airport object type in a first context of delay-flight action type. In certain embodiments, the first action log type 240A-1 includes one or more properties of the target object type 230A, one or more properties of the object type 230B, and one or more action parameters of action type 220A. In some embodiments, a first action log (e.g., a log of the flight delay 1) generated from the first action log type 240A-1 is linked to a target object (e.g., flight 123) of the target object type 230A and a second object (e.g., airport A) of the object type 230B. In certain embodiments, a link to an object is an object identifier (ID) identifying the object.

In some embodiments, the object type 230A is associated with the object type 230B and the object type 230C in a second context of the action type 220A. For example, a flight object type is associated with an airport object type and a weather object type in the context of delay-flight action type. In certain embodiments, the second action log type 240A-2 includes one or more properties of the target object type 230A, one or more properties of the object type 230B, one or more properties of the object type 230C, and one or more action parameters of action type 220A. In some embodiments, a second action log (e.g., a log of the flight delay 2) generated from the second action log type 240A-2 is linked to a target object (e.g., flight 123) of the target object type 230A, a second object (e.g., airport A) of the object type 230B, and a third object (e.g., weather of the airport A at XX time) of the object type 230C. As mentioned above, this allows to enable the technical effect of an efficient memory use.

According to some embodiments, the action context 222 includes a first state of the target object before the action is taken. In some examples, the action context 222 includes a second state of the target object after the action is taken. In certain examples, the action context 222 includes metadata associated with the action. In some embodiments, the action type 220 includes or is associated with one or more action rules (e.g., permission, permissible range, etc.). In some examples, the action context 222 includes at least one action rule of the one or more action rules.

According to certain embodiments, the operation software 210 is configured to send the action logs 250 to a data repository (e.g., a local data repository in the user device 150 in FIG. 1, the data repository 135 in FIG. 1). In some embodiments, the action logs 250 are configured to be uploaded to a data repository (e.g., the data repository 135 in FIG. 1), for example, via a software service, a data synchronization process. In certain embodiments, the action log 250 can be retrieved as a log report. In some embodiments, the action log 250 can be retrieved as a log report for a specific object (e.g., an object of object type 230A) including action logs associated with actions on the specific object. In some examples, the action logs include actions of different action types. In certain embodiments, the action log 250 can be retrieved as a log report for a specific action type (e.g., action type 220A).

According to some embodiments, the action log 250 (e.g., a log report) can be analyzed via different software and/or via different users, where each software or user is associated with a respective access level and/or access role. In some embodiments, the action log 250 can be retrieved with some data rows and/or data fields hidden depending on the access level and/or data roles. In certain embodiments, the access level includes a high access level, a middle access level, and a low access level, where the action log 250 includes all data fields when accessed at the high access level, the action log 250 includes a first subset of data fields when accessed at the middle access level, and the action log 250 includes a second subset of data fields when accessed at the low access level, where the first subset of data fields is larger than the second subset of data fields. In certain examples, at least one data field (e.g., location) is included in the first subset of data fields and not in the second subset of data fields. In some embodiments, the access role includes a plurality of roles (e.g., auditor role, analyst role, operator rule).

In certain embodiments, the action log 250 includes a first subset of data rows when accessed at a first role (e.g., analyst role) and the action log 250 includes a second subset of data rows when accessed at a second role (e.g., auditor role), where the first subset of data rows is larger than the second subset of data rows. In some examples, at least one data row is included in the first subset of data rows and not in the second subset of data rows. In certain embodiments, the action log 250 includes a first subset of data when accessed at a first role (e.g., analyst role) and the action log 250 includes a second subset of data when accessed at a second role (e.g., auditor role). In some examples, the first subset of data includes more data fields than the data fields in the second subset of data and the first subset of data and the first subset of data includes more data rows than the data rows in the second subset of data. In certain examples, the first subset of data includes less data fields than the data fields in the second subset of data and the first subset of data and the first subset of data includes more data rows than the data rows in the second subset of data. In certain embodiments, a reason of the action can be inferred based on analyzing the action log 250.

For example, for a decision of a pilot delaying a flight, the operation software 210 may have three object types and one action type to represent the decision, such as a pilot object type, a flight object type, a plane object type, and a delay-flight action type, where the flight object type is designated as the target object type. When the decision is submitted, an action log 250A is generated with one or more properties of the object types, one or more action parameters of the action type, and an action context. As an example, for a decision of an airport controller delaying a flight, the operation software 210 may have four object types and one action type to represent the decision, such as an airport controller object type, a flight object type, a plane object type, a weather object type, and a delay-flight action type, where the flight object type is designated as the target object type. When the decision is submitted, an action log 250B is generated with one or more object properties of the object types, one or more action parameters of the action type, and an action context. In some examples, the action log 250 can be analyzed to determine reasons for flight delays.

FIG. 3 is a simplified diagram showing a method 300 for building an application with action logs according to certain embodiments of the present disclosure. This diagram is merely an example. One of ordinary skill in the art would recognize many variations, alternatives, and modifications. The method 300 for building an application with action logs includes processes 310, 315, 320, 325, 330, 335, 340, and 345. Although the above has been shown using a selected group of processes for the method 300 for building an application with action logs, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present disclosure.

In some embodiments, some or all processes (e.g., steps) of the method 300 are performed by a system (e.g., the computing system 700). In certain examples, some or all processes (e.g., steps) of the method 300 are performed by a computer and/or a processor directed by a code. For example, a computer includes a server computer and/or a client computer (e.g., a personal computer). In some examples, some or all processes (e.g., steps) of the method 300 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at the process 310, the operation software design system (e.g., the operation software design system 110 in FIG. 1) is configured to access a target object type, where the target object type includes one or more object properties. In certain embodiments, at the process 315, the system is configured to access an action type, the action type comprising one or more action parameters and associated with one or more action rules, the action type associated with editing a target object of the target object type. In some embodiments, at the process 320, the operation software design system is configured to identify a second object type associated with the target object type for the action type.

According to certain embodiments, at the process 325, the operation software design system is configured to present one or more first options associated with the target object type and one or more second options associated with the action type. In some embodiments, the one or more first options include a selection of each object property of the one or more properties of the target object type. In certain embodiments, the one or more first options include a selection of each object property of the one or more properties of the second object type. In some embodiments, the action type is associated with three or more object types and the one or more first options include a selection of one or more properties of the three or more object types. In certain embodiments, the one or more second options include a selection of each action parameter of the one or more action parameters of the action type.

According to some embodiments, at the process 330, the operation software design system is configured to receive a response on the one or more first options and the one or more second options. In certain embodiments, at the process 335, the operation software design system is configured to identify action context. In some embodiments, the system is configured to identify a first action context for a first user, and the system is configured to identify a second action context for a second user, where the first action context is different from the second action context.

According to certain embodiments, at the process 340, the operation software design system is configured to generate an action log type based on the response, where the action log type includes one or more object properties of the target object type and/or the second object type, and one or more action parameters of the action type, and the action context. In some embodiments, the action context comprising information associated with at least one selected from a group consisting of a second object type, a first state of the target object before the action is taken, metadata associated with the action, and one action rule of the one or more action rules, wherein the second object type is different from the target object type.

According to some embodiments, at the process 345, the operation software design system is configured to build a software application, wherein the software application includes the target object type, the action type, and the action log type.

Figure 4A:
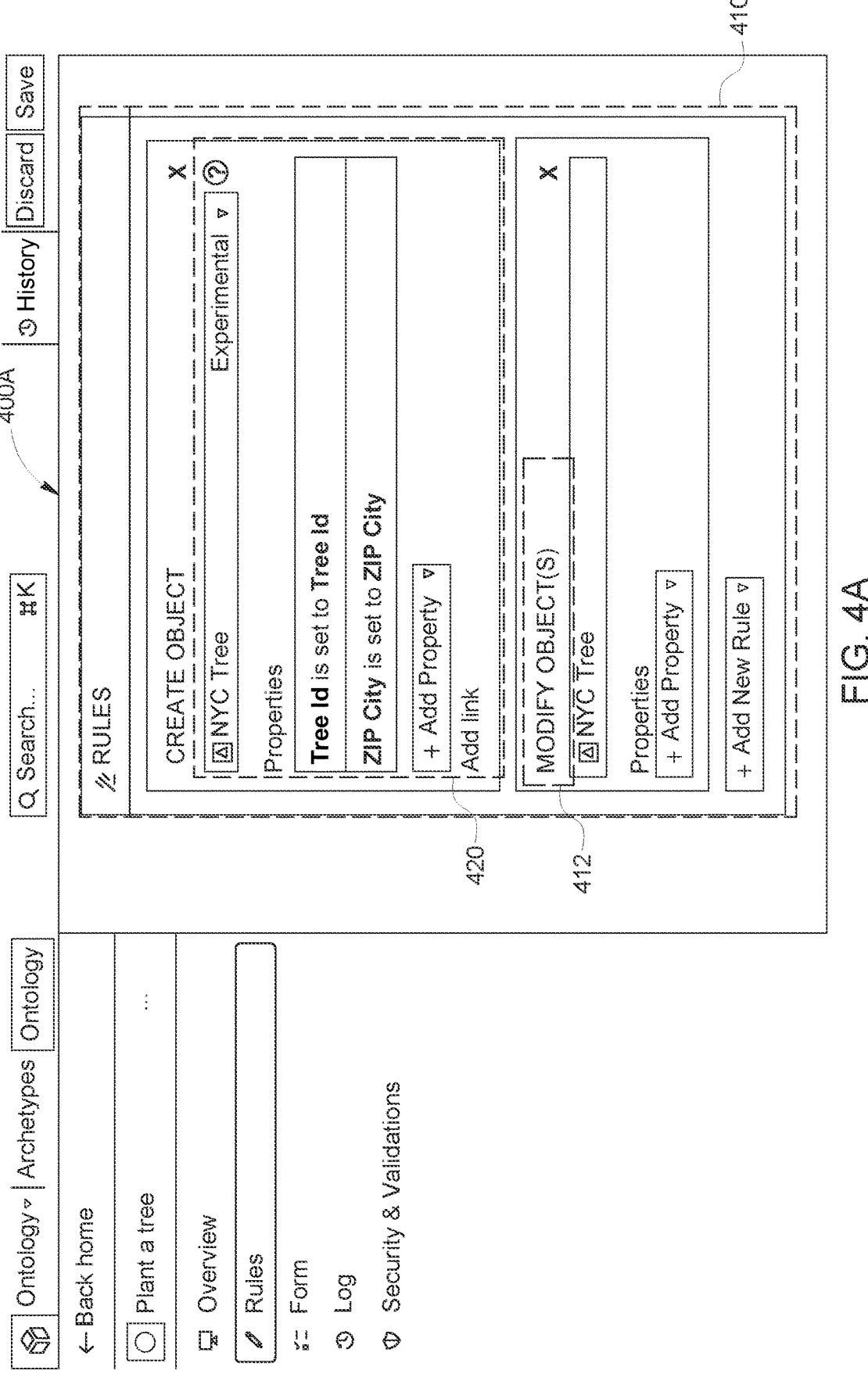
FIGS. 4A-4C are example user interfaces of an operation software design system, in accordance with certain embodiments of the present disclosure.
Figure 4B:
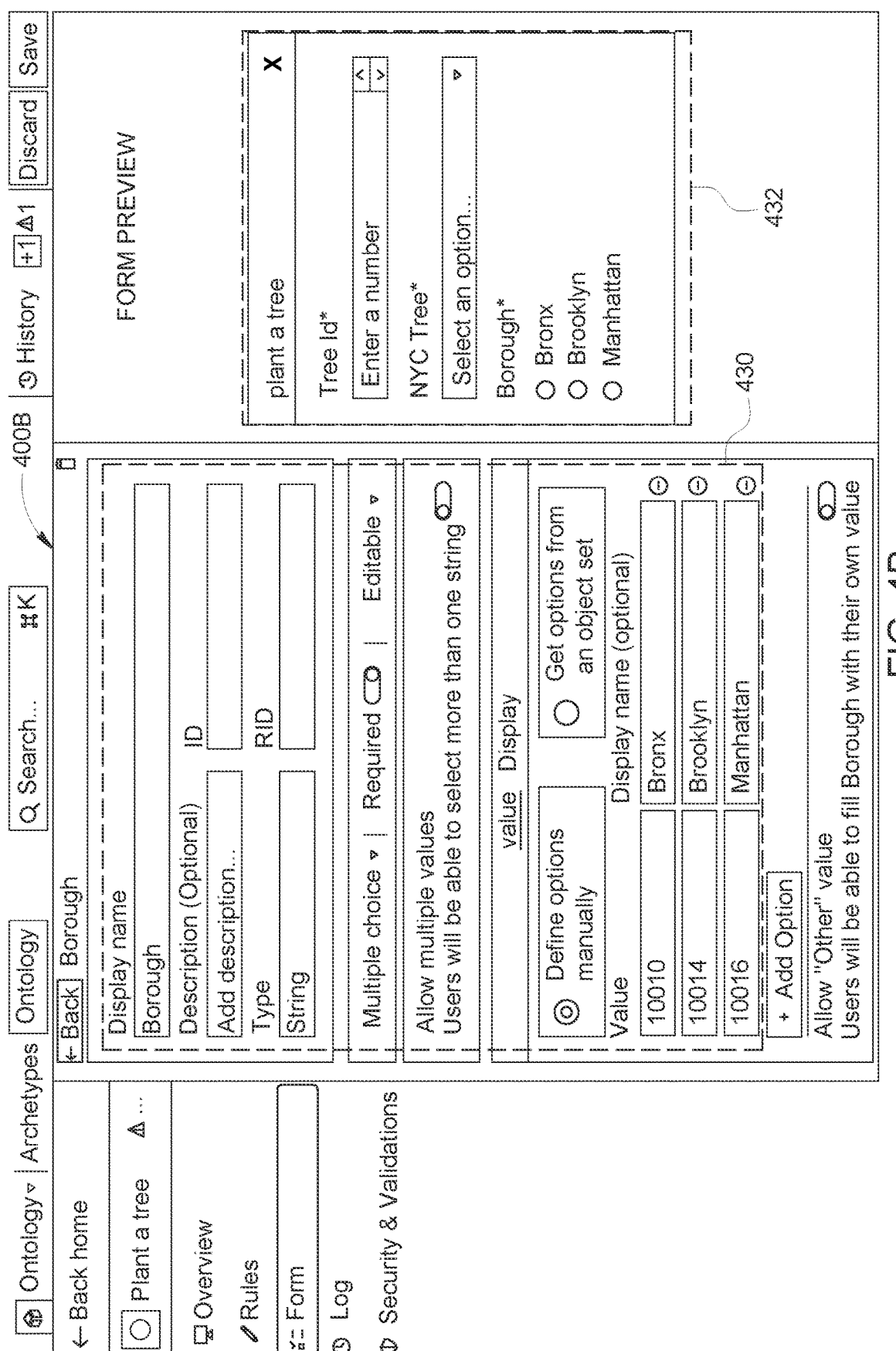
Figure 4C:
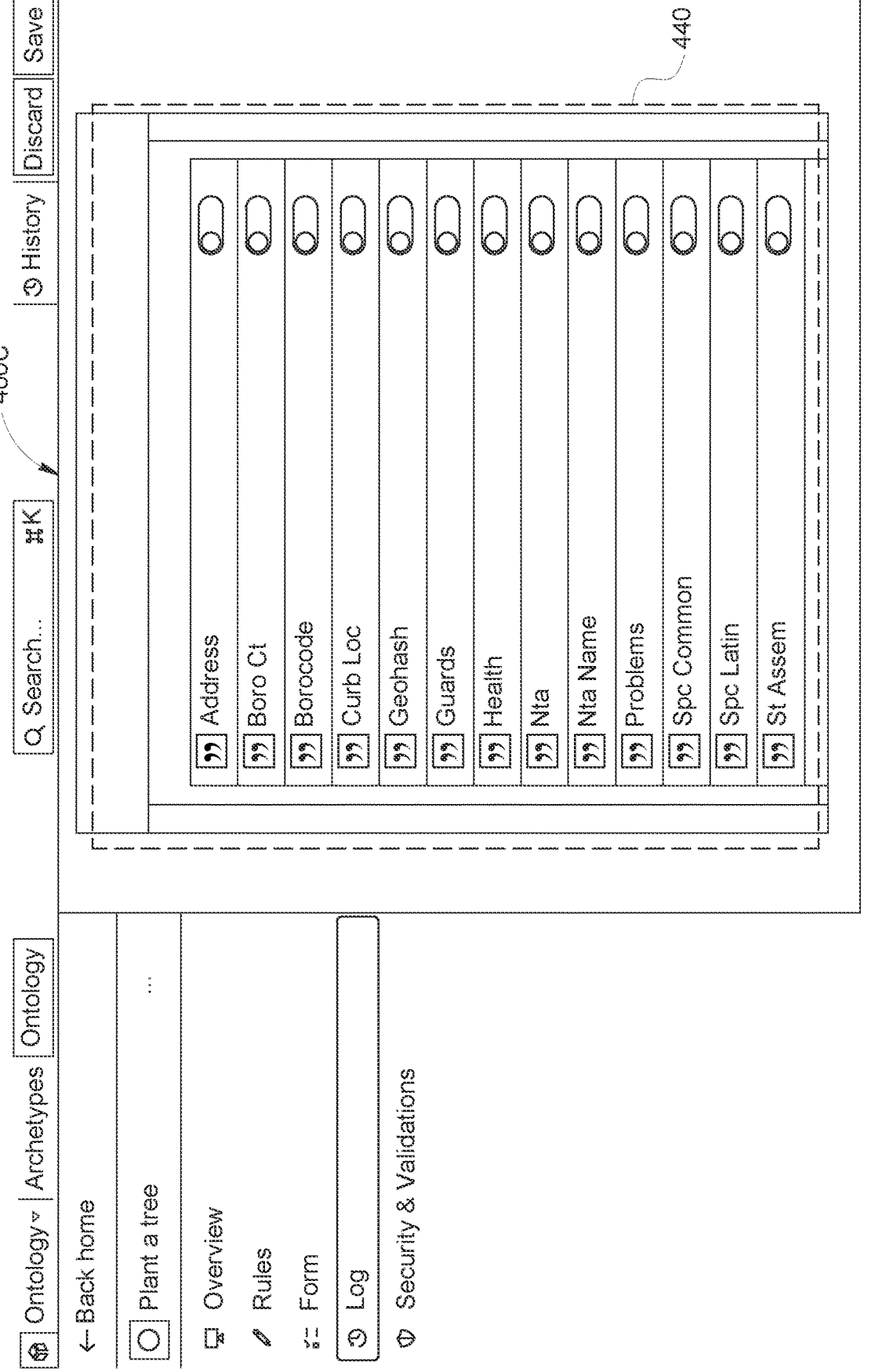

FIGS. 4A-4C are example user interfaces of an operation software design system, in accordance with certain embodiments of the present disclosure. According to some embodiments, using a user interface 400A illustrated in FIG. 4A, the operation software design system (e.g., operation software design system 110 in FIG. 1) is configured to create a new action type 410. In certain embodiments, the action type 410 includes a type of action 412 to be applied to one or more objects 420, such as create, modify, and/or delete an object. In one example, the new action type is a plant-tree action. In certain embodiments, the created action type can be used to log information on the action of the created action type, including action times. For example, the plant-tree action type is used to log the different times that trees are planted (e.g., during an event). In some embodiments, the action type name is defined (e.g., "plant a tree"). In certain embodiments, one or more rules of the action type is defined or set. In some embodiments, the action is to create an object (e.g., tree object, New York City (NYC) Tree object). In certain embodiments, the action is to modify an object, for example, editing the tree object.

According to some embodiments, as illustrated in FIG. 4A, the system is configured to add one or more properties to the object. For example, a tree object includes a tree identifier (ID) and a Zip City (e.g., where a tree is planted). In certain embodiments, the system can link one object to another object. As an example, the system is configured to link a tree object to a city object. In certain embodiments, an action being taken is configured to modify a property of an object. For example, a "plant a tree" action is configured to increment a tree count by one in a city object. In some embodiments, the action type is associated with one or more rules for one or more validations. For example, a "plant a tree" action includes a validation rule (e.g., an action rule) of a range of zip codes. As an example, a "plant a tree" action includes a validation rule (e.g., an action rule) of a geographic range.

According to certain embodiments, using the user interface 400B illustrated in FIG. 4B, the system includes a user interface design 430 to configure how one or more objects, one or more actions, and one or more properties (e.g., object properties, action parameters) can be presented in a user interface. In some embodiments, a user interface preview 432 can be included in the operation software design system.

According to some embodiments, using the user interface 400C illustrated in FIG. 4C, the system includes a configuration of action log types 440. In certain embodiments, the operation software design system populates the configuration interface with one or more actions, one or more objects, one or more properties associated with the designed action. In some embodiments, the configuration of action log types 440 allows a user to select the data to be logged associated with the designed action. In certain embodiments, one or more action logs generated from the action log types are linked to one or more objects. In some embodiments, one or more action logs are linked to one or more actions. In certain embodiments, one or more action logs are linked to one or more object properties. In some embodiments, one or more action logs are linked to one or more action parameters.

In some embodiments, the one or more action logs are instantiated at a first time and the linked one or more objects are changed at a second time, where the one or more action logs include the links to the one or more objects. In certain embodiments, the one or more action logs include snapshots associated with a state (e.g., one or more object properties data) of the linked one or more objects when the action is taken. As mentioned above, this allows to enable the technical effect of an efficient memory use.

According to certain embodiments, action log models action submissions as object types to be analyzed and displayed in an object-aware software system. In some embodiments, an operation software (e.g., a software, a software system, a software module, etc.) can use the action log type as an input to decision-making workflows and monitor changes to the ontology. In certain embodiments, actions are the primary way to modify the ontology and trigger related side effects. In some embodiments, these ontology modifications are the result of a specific decision or are accompanied by data audibility requirements. In certain embodiments, the action log simplifies the generation and maintenance of action log types so that the operation software can analyze decisions and maintain a log of all data edits. For example, for easy identification, all action log types are prefaced with [LOG].

According to some embodiments, action log types map one to one with action types. In certain embodiments, submitting an action generates a single new object (e.g., an action log) of the corresponding action log type. In some embodiments, this newly created object is automatically linked to all objects edited by the submitted action. For example, a close-alerts (e.g., Close-Flight-Alerts) action type that modifies the "Status" property of many selected alert objects to "Closed". As an example, when configured with an action log type, closing 10 alert objects at once will yield a single action log with links (e.g., foreign key links) to all 10 Alert objects.

According to certain embodiments, an action log type includes one or more of the following data fields: 1) action identifier (e.g., RID): a unique identifier for an action submission (e.g., a single action submission); 2) action type identifier (e.g., RID): a unique identifier for an action type (e.g., a single action type); 3) action type version: a version number of the action type (e.g., a version number that auto-increments with each); 4) timestamp: for example, UTC timestamp of action submission; 5) user identifier: for example, user identifier (e.g., multi-pass user id) for action submitting user; 6) summary: a customizable string to describe the action, which is an optional data field; 7) parameter values, which are optional; 8) property values of object reference parameters, which are optional; 9) instance identifier: for example, a coupled application instance identifier (e.g., webhook instance Id); and 10) notification recipients by userId, which are optional. In some embodiments, some of the data fields are required, such as an action identifier, a timestamp, and a user identifier.

According to some embodiments, action log types can be configured to store object properties that are not edited by the action. In certain embodiments, the action log types support storing not just data edits, but also the context that motivated the data edits. Returning to the example of a close-alerts action type, imagine the alert objects also have a "Priority" property containing values "High Priority" and "Low Priority" as well as a "Created at" timestamp and a "Source" machine. As an example, the action log type for the close-alert action type supports storing these properties, even if they are not edited by one or more instances of close-alert actions. In some embodiments, this enables answering questions like "Where are most 'High Priority'

Alerts coming from?" or even "How long does it take to close 'High Priority' Alerts?".

According to certain embodiments, system administrators (e.g., ontology administrators) can require an action log for all actions that edit priority object types. In some embodiments, this ensures a complete record of any time key object types are edited. In certain embodiments, to enable this setting, the edited object type must be edited "By Actions only," for example, link to by-actions-only documents. In some embodiments, to configure the action log type for a function-backed action type, the backing ontology edit function must have edits provenance configured.

Figure 5:
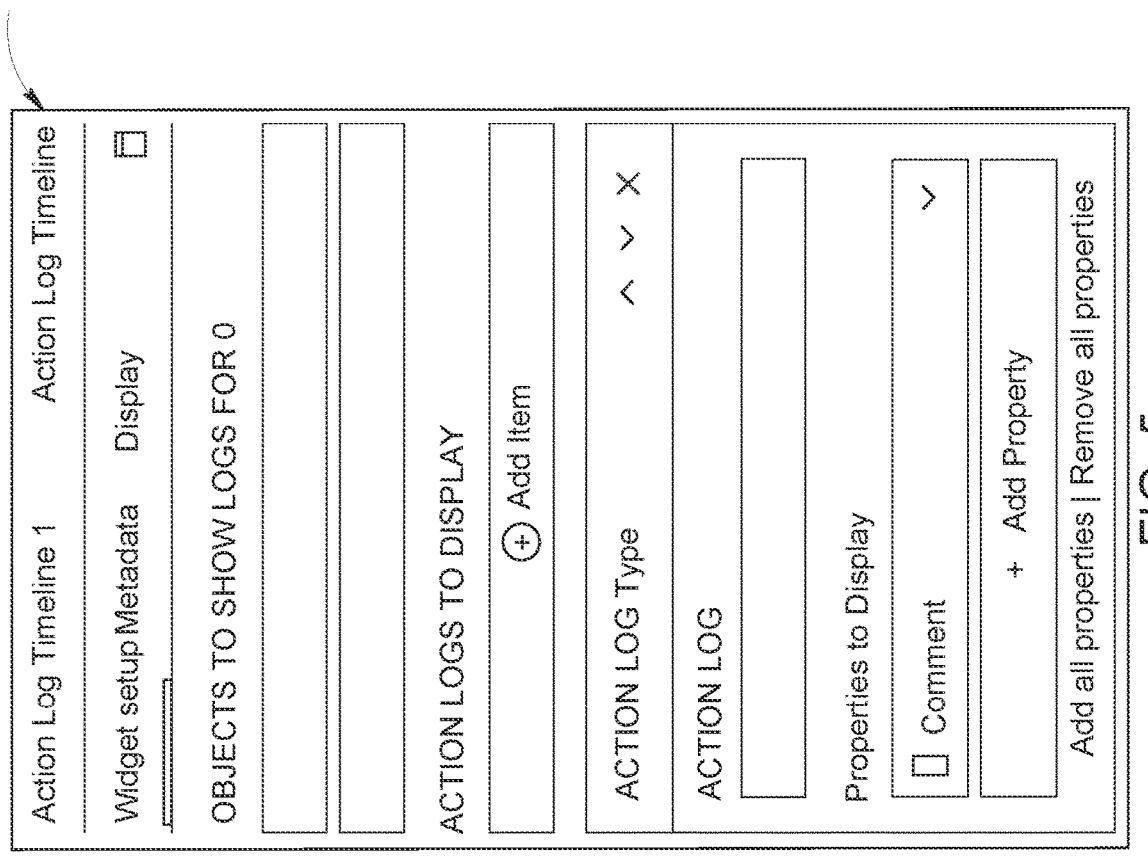
FIG. 5 is an example user interface showing action logs in a timeline for presentation, according to certain embodiments of the present application.

According to some embodiments, a client application (e.g., a custom workshop widget) supports viewing action logs or action log types in a timeline, also referred to as a log report. FIG. 5 is an example user interface showing action logs in a timeline for presentation, according to certain embodiments of the present application. In certain embodiments, the timeline can be configured to support data audits, helping to answer, "What changed, by who, and when?". In some embodiments, action log types can be combined (e.g., unioned) together for a view (e.g., a wholistic view) of edits within a use case or across an ontology. In certain embodiments, the operation software design system may configure the action log timeline by selecting the edited object type, then choosing which action log types to display, along with the desired action log type properties.

Figure 6:
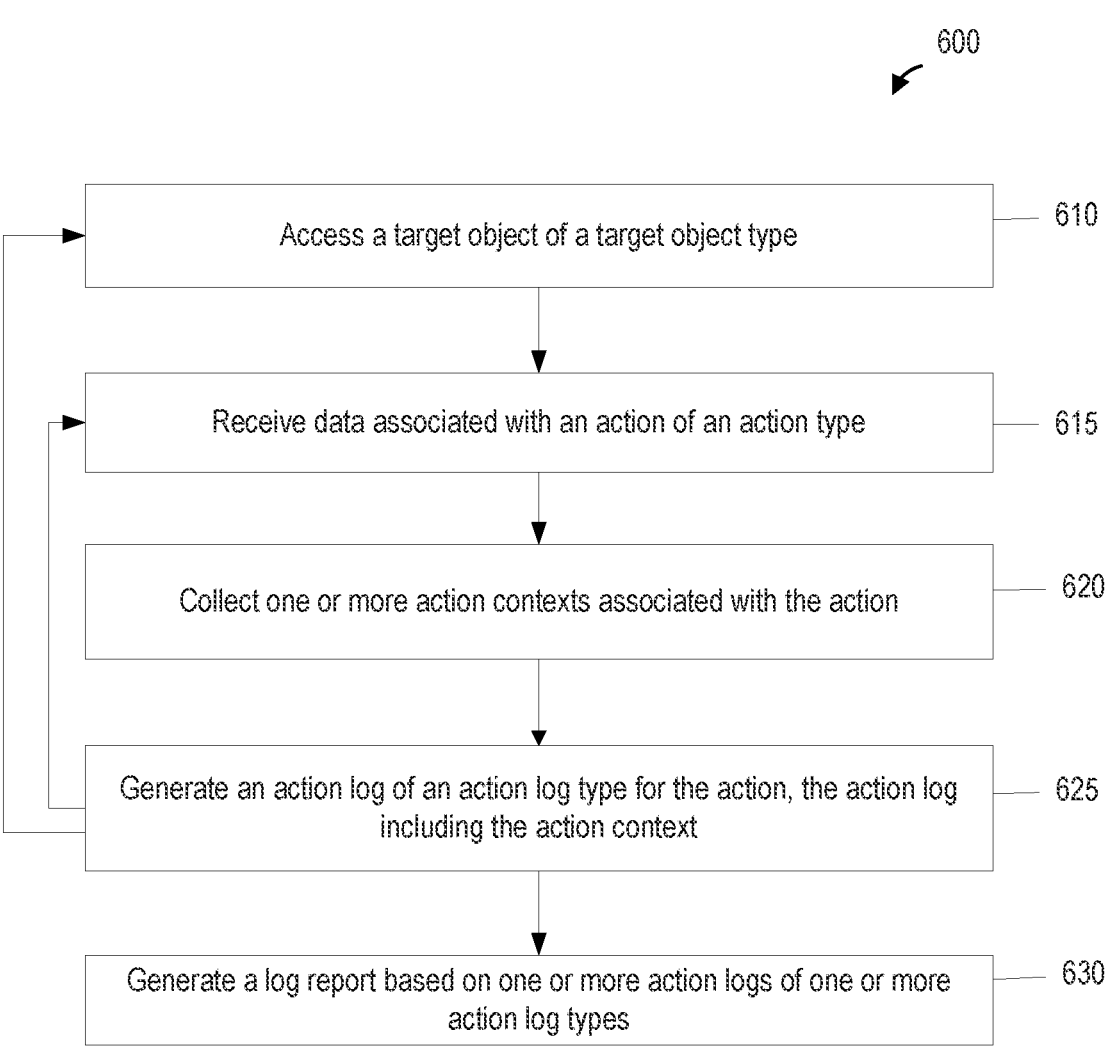
FIG. 6 is a simplified diagram showing a method for software action logging according to certain embodiments of the present disclosure.

FIG. 6 is a simplified diagram showing a method 600 for software action logging according to certain embodiments of the present disclosure. This diagram is merely an example. One of ordinary skill in the art would recognize many variations, alternatives, and modifications. The method 600 for software action logging includes processes 610, 615, 620, 625, and 630. Although the above has been shown using a selected group of processes for the method 600 for software action logging, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present disclosure.

In some embodiments, some or all processes (e.g., steps) of the method 600 are performed by a system (e.g., the computing system 700, the user device 150). In certain examples, some or all processes (e.g., steps) of the method 600 are performed by a computer and/or a processor directed by a code. For example, a computer includes a server computer and/or a client computer (e.g., a personal computer). In some examples, some or all processes (e.g., steps) of the method 600 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at process 610, the system accesses a target object of a target object type. In certain embodiments, the target object is an instance of the target object type having an object identifier. In some embodiments, the target object includes one or more object properties. In certain embodiments, the target object includes different states that change over time. For example, a flight A object includes a current state (e.g., departed), and a series of previous states (e.g., departing at time X on day 1, departing at time Y on day 2, etc.).

According to certain embodiments, at process 615, the system receives data associated with an action of an action type. In some embodiments, the action type includes one or more action parameters and/or one or more action rules. In certain embodiments, the one or more action rules are associated with user roles. In some embodiments, the action type includes user information, such as a user role, a user group, a user identifier, and/or the like.

According to some embodiments, at process 620, the system collects one or more action contexts associated with the action. In certain embodiments, the one or more action contexts are associated with the action type. In some embodiments, two or more action contexts are associated with the action type. In certain embodiments, two or more action contexts are associated with an action type depending on an object type of the object associated with the action of the action type. According to certain embodiments, an action context includes a decision context associated with the decision (e.g., action time, related object) and a workflow context that is hidden from the user. In some embodiments, the action context includes one or more comments.

In certain embodiments, the action context includes information associated with at least one selected from a group consisting of a second object type, a state of the target object before the action is taken, a second state of the target object after the action is taken, metadata associated with the action, and one action rule of the one or more action rules, wherein the second object type is different from the target object type. In certain embodiments, the system collects a first action context for a first action of the action type taken by a first user and/or at a first time. In some embodiments, the system collects a second action context for a first action of the action type taken by a second user and/or at a second time.

According to some embodiments, at process 625, the system generates an action log of an action log type for the action, the action log type including the action context. In certain embodiments, an action log includes one or more action contexts. In some embodiments, the action log includes a first action context associated with the action type, a first object type and/or a first object of the first object type. In certain embodiments, the action log includes a second action context associated with the action type, a second object type and/or a second object of the second object type. In some embodiments, the first action context is different from the second action context. In certain embodiments, the system will go back to process 615 to collect more data associated with the action and/or the action type (e.g., subsequent actions of the same action type, more actions of the same action type taken by different users, etc.). In some embodiments, the system will go back to process 610 to collect data associated with different target objects and/or different target object types. In certain embodiments, the system receives data associated with a first action of a first action type associated with the target object and generate a first action log of the first action log type. In some embodiments, the system the system receives data associated with a second action of a second action type associated with the target object and generate a second action log of the second action log type.

According to certain embodiments, at process 630, the system generates a log report, also referred to as an action log, based on one or more action logs of one or more action log types. In some embodiments, the system can generate a log report for a specific target object (e.g., flight A) including two or more action logs associated with two or more actions. In certain embodiments, the two or more actions are taken by different users (e.g., pilot, air traffic controller). In some embodiments, the system presents the log report on a user interface. In certain embodiments, the log report is presented in an order of time. In some embodiments, the log report is present in an order of user.

In some embodiments, the system can generate a log report for a specific action type including two or more action logs associated with two or more actions of the specific action type. In certain embodiments, the two or more actions are taken by different users (e.g., pilot, air traffic controller). In some embodiments, the system presents the log report on a user interface. In certain embodiments, the log report is presented in the order of time (e.g., timeline). In some embodiments, the log report is present in the order of user or sorted by users.

Figure 7:
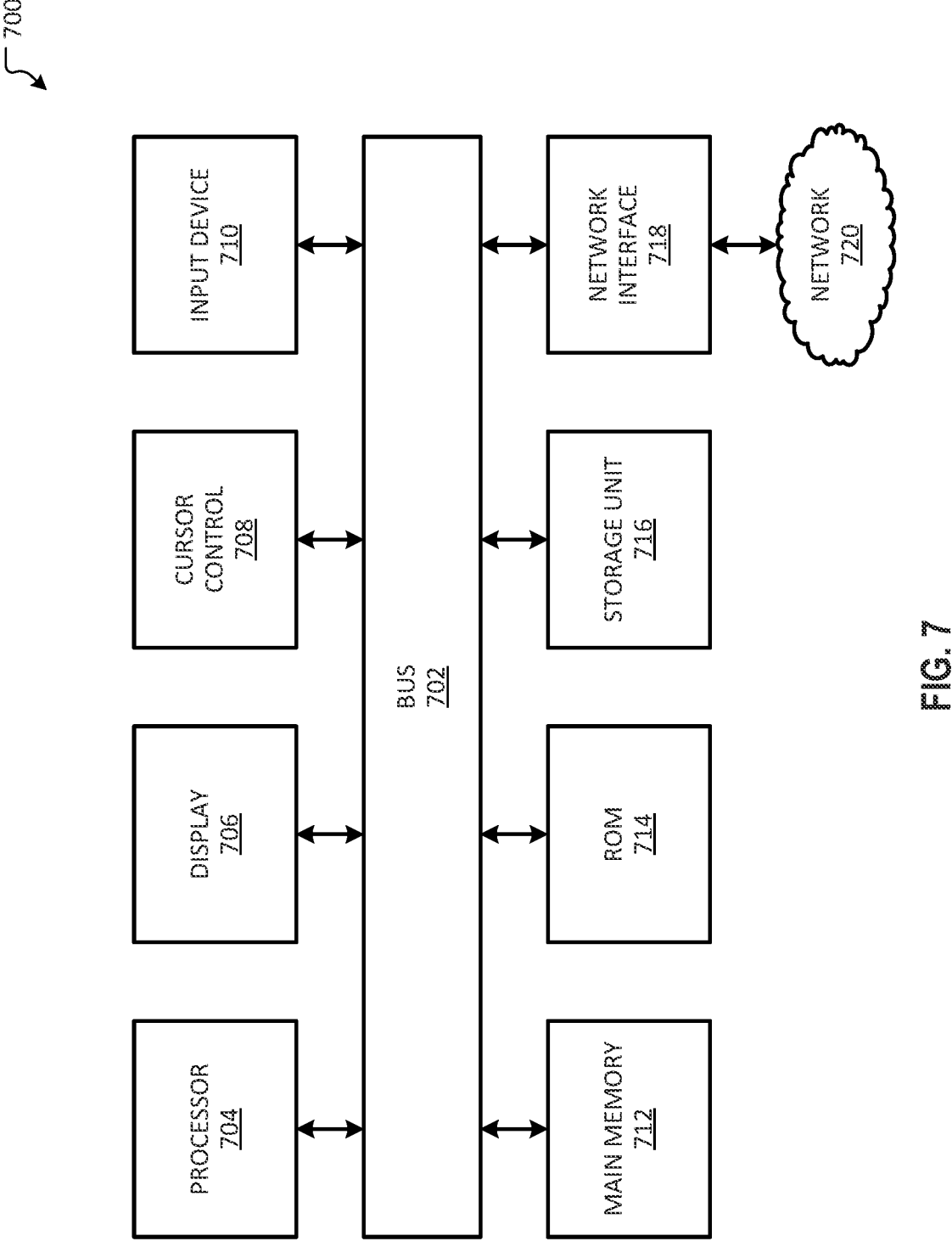
FIG. 7 is a simplified diagram showing a computing system for implementing a system for software action logging in accordance with at least one example set forth in the disclosure.

FIG. 7 is a simplified diagram showing a computing system for implementing a system 700 for software action logging in accordance with at least one example set forth in the disclosure. This diagram is merely an example, which should not unduly limit the scope of the claims. One of ordinary skill in the art would recognize many variations, alternatives, and modifications.

The computing system 700 includes a bus 702 or other communication mechanism for communicating information, a processor 704, a display 706, a cursor control component 708, an input device 710, a main memory 712, a read only memory (ROM) 714, a storage unit 716, and a network interface 718. In some embodiments, some or all processes (e.g., steps) of the methods 300, and/or 600 are performed by the computing system 700. In some examples, the bus 702 is coupled to the processor 704, the display 706, the cursor control component 708, the input device 710, the main memory 712, the read only memory (ROM) 714, the storage unit 716, and/or the network interface 718. In certain examples, the network interface is coupled to a network 720. For example, the processor 704 includes one or more general purpose microprocessors. In some examples, the main memory 712 (e.g., random access memory (RAM), cache and/or other dynamic storage devices) is configured to store information and instructions to be executed by the processor 704. In certain examples, the main memory 712 is configured to store temporary variables or other intermediate information during execution of instructions to be executed by processor 704. For examples, the instructions, when stored in the storage unit 716 accessible to processor 704, render the computing system 700 into a special-purpose machine that is customized to perform the operations specified in the instructions. In some examples, the ROM 714 is configured to store static information and instructions for the processor 704. In certain examples, the storage unit 716 (e.g., a magnetic disk, optical disk, or flash drive) is configured to store information and instructions.

In some embodiments, the display 706 (e.g., a cathode ray tube (CRT), an LCD display, or a touch screen) is configured to display information to a user of the computing system 700. In some examples, the input device 710 (e.g., alphanumeric and other keys) is configured to communicate information and commands to the processor 704. For example, the cursor control component 708 (e.g., a mouse, a trackball, or cursor direction keys) is configured to communicate additional information and commands (e.g., to control cursor movements on the display 706) to the processor 704.

According to some embodiments, a method for software action logging, the method comprising: accessing a target object type, the target object type comprising one or more object properties; accessing an action type, the action type comprising one or more action parameters and associated with one or more action rules, the action type associated with editing a target object of the target object type; generating an action log type comprising at least one of the one or more object properties and at least one of the one or more action parameters, the action log type further comprising an action context associated with an action of the action type, the action context comprising information associated with at least one selected from a group consisting of a second object type, a first state of the target object before the action is taken, a second state of the target object after the action is taken, metadata associated with the action, and one action rule of the one or more action rules, wherein the second object type is different from the target object type; and building a software application, wherein the software application comprises the target object type, the action type, and the action log type; wherein the method is performed using one or more processors. For example, the method is implemented according to at least FIG. 1, FIG. 2, and/or FIG. 3.

In some embodiments, the method further includes the steps of: presenting one or more first options associated with the target object type and one or more second options associated with the action type to a user; and receiving a response from the user; wherein the generating an action log type comprises generating the action log type based on the response. In certain embodiments, the one or more first options associated with the target object type comprise a third option on a property of the second object type, the second object type being associated with the target object type for the action type. In some embodiments, the editing a target object comprises creating a target object of the target object type, editing at least one property of one or more properties of an existing target object of the target object type, or deleting the target object. In certain embodiments, the software application, when executed, is configured to: generate a first action log using the action log type for a first action of the action type; and generate a second action log using the action log type for a second action of the action type; wherein the first action log includes a first action context; wherein the second action log includes a second action context different from the first action context.

According to certain embodiments, a method for building software with software action logging, the method comprising: accessing a target object of a target object type, the target object type comprising one or more object properties; receiving data associated with an action of an action type, the action type comprising one or more action parameters and associated with one or more action rules, the action type associated with editing a target object of the target object type; and generating an action log of an action log type, the action log type comprising at least one of the one or more object properties and at least one of the one or more action parameters, the action log type further comprising an action context associated with an action of the action type, the action context comprising information associated with at least one selected from a group consisting of a second object type, a state of the target object before the action is taken, a second state of the target object after the action is taken, metadata associated with the action, and one action rule of the one or more action rules, wherein the second object type is different from the target object type; wherein the method is performed using one or more processors. For example, the method is implemented according to at least FIG. 1, FIG. 2, FIG. 3, and/or FIG. 6.

In some embodiments, the editing a target object comprises creating the target object of the target object type, editing at least one object property of one or more object properties of the target object, or deleting the target object. In certain embodiments, wherein the one or more action rules include a first action rule associated with a first user role, wherein the one or more action rules include a second action rule associated with a second user role, wherein the first action rule is different from the second action rule. In some embodiments, the action log includes information associated with a second object of the second object type, wherein the action does not edit the second object.

In certain embodiments, the action log includes a link to the target object. In some embodiments, the generating an action log of an action log type comprises: collecting the action context; and generating the action log that includes the action context. In certain embodiments, wherein the action is a first action and the action log is a first action log, and the method further comprises: generating a second action log using the action log type for a second action of the action type; wherein the first action log includes a first action context; wherein the second action log includes a second action context different from the first action context. In certain embodiments, the action type is a first action type, the action is a first action, the action log type is a first action log type, and the action log is a first action log, and the method further comprises: receiving data associated with a second action of a second action type, the second action type associated with editing the target object; generating a second action log of a second action log type, the second action log being associated with the second action; and generating a log report including the first action log and the second action log.

According to some embodiments, a system for software action logging, the system comprising: one or more memories having instructions stored thereon; one or more processors configured to execute the instructions and perform operations comprising: accessing a target object of a target object type, the target object type comprising one or more object properties; receiving data associated with an action of an action type, the action type comprising one or more action parameters and associated with one or more action rules, the action type associated with editing a target object of the target object type; and generating an action log of an action log type, the action log type comprising at least one of the one or more object properties and at least one of the one or more action parameters, the action log type further comprising an action context associated with an action of the action type, the action context comprising information associated with at least one selected from a group consisting of a second object type, a state of the target object before the action is taken, a second state of the target object after the action is taken, metadata associated with the action, and one action rule of the one or more action rules, wherein the second object type is different from the target object type. For example, the system is implemented according to at least FIG. 1, FIG. 2, FIG. 3, and/or FIG. 6.

In some embodiments, the editing a target object comprises creating the target object of the target object type, editing at least one object property of one or more object properties of the target object, or deleting the target object. In certain embodiments, wherein the one or more action rules include a first action rule associated with a first user role, wherein the one or more action rules include a second action rule associated with a second user role, wherein the first action rule is different from the second action rule. In some embodiments, the action log includes information associated with a second object of the second object type, wherein the action does not edit the second object.

In certain embodiments, the action log includes a link to the target object. In some embodiments, the generating an action log of an action log type comprises: collecting the action context; and generating the action log that includes the action context. In certain embodiments, wherein the action is a first action and the action log is a first action log, and the operations further comprise: generating a second action log using the action log type for a second action of the action type; wherein the first action log includes a first action context; wherein the second action log includes a second action context different from the first action context. In certain embodiments, the action type is a first action type, the action is a first action, the action log type is a first action log type, and the action log is a first action log, and the operations further comprise: receiving data associated with a second action of a second action type, the second action type associated with editing the target object; generating a second action log of a second action log type, the second action log being associated with the second action; and generating a log report including the first action log and the second action log.

Examples of the present disclosure have the technical advantage of logging context of an action in an efficient manner (e.g., reducing memory use), for example, by linking the action log to objects of context, instead of including all data fields of objects of context in the action log. In some examples, subsequent to generating a log linked to a target object, the target object may be edited. For example, further information and properties can be added to a target object. This allows changes to the target object to be efficiently propagated to series of actions logs that are linked to the target object without having to update each log entry separately. In some examples, additional objects may represent further information, such as a location of an action or an object. An action log may include a link to the additional object, or the target object itself may be linked to the additional object. In some examples, a target object may be modified to include a link to an additional object subsequent to the generation of an action log including a link to the target object. In some examples, the action log may record a change made to a target object so that previous states of the object can be reconstructed from the current state of target object and a collection of action logs detailing the history of changes to the target object. In some examples, a previous version of the target object may be reconstructed by making changes to a most recent state of the target object by reversing a change made to a previous version of a target object.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A computer-implemented method for building software with software action logging, the method comprising:

accessing a target object type, the target object type comprising one or more object properties;

accessing an action type, the action type comprising one or more action parameters and being associated with one or more action rules, the action type being associated with editing a target object of the target object type;

generating an action log type comprising at least one of the one or more object properties and at least one of the one or more action parameters, the action log type further comprising an action context associated with an action of the action type, the action context comprising information associated with at least a second object type, wherein the second object type is different from the target object type; and building a software application, wherein the software application comprises the target object type, the action type, and the action log type, wherein the action type is a first data structure including a plurality of first data fields and the action log type is a second data structure including a plurality of second data fields, wherein the software application is configured to generate an action log of the action log type, and wherein the action log includes a first link to the target object and a second link to a second object of the second object type; and deploying the built software application to a computing device to generate the action log including the first link to the target object and the second link to the second object of the second object type;

wherein the method is performed using one or more processors.

2. The computer-implemented method of claim 1, further comprising:

presenting one or more first options associated with the target object type and one or more second options associated with the action type to a user; and receiving a response from the user; wherein the generating an action log type comprises generating the action log type based on the response.

3. The computer-implemented method of claim 2, wherein the one or more first options associated with the target object type comprise a third option on an object property of the second object type, the second object type being associated with the target object type for the action type.

4. The computer-implemented method of claim 1, wherein the software application, when executed, is configured to:

generate a first action log using the action log type for a first action of the action type; and generate a second action log using the action log type for a second action of the action type;

wherein the first action log includes a first action context;

wherein the second action log includes a second action context different from the first action context.

5. A computer-implemented method for software action logging, the method comprising:

accessing a target object of a target object type, the target object type comprising one or more object properties;

receiving data associated with an action of an action type, the action type comprising one or more action parameters and being associated with one or more action rules, the action type being associated with editing a target object of the target object type;

generating an action log of an action log type, the action log type comprising at least one of the one or more object properties and at least one of the one or more action parameters, the action log type further comprising an action context associated with the action of the action type, the action context comprising information associated with at least a second object type, wherein the second object type is different from the target object type, and wherein the action log includes a first link to the target object and a second link to a second object of the second object type; and installing a software application comprising the target object type, the action type, and the action log type, wherein the action type is a first data structure including a plurality of first data fields and the action log type is a second data structure including a plurality of second data fields, wherein the software application is configured to generate the action log of the action log type including the first link to the target object and the second link to the second object of the second object type;

wherein the method is performed using one or more processors.

6. The computer-implemented method of claim 5, wherein the editing a target object comprises creating the target object of the target object type, editing at least one object property of one or more object properties of the target object, or deleting the target object.

7. The computer-implemented method of claim 5, wherein the one or more action rules include a first action rule associated with a first user role, wherein the one or more action rules include a second action rule associated with a second user role, wherein the first action rule is different from the second action rule.

8. The computer-implemented method of claim 5, wherein the action log includes information associated with a second object of the second object type, wherein the action does not edit the second object.

9. The computer-implemented method of claim 5, wherein the generating an action log of an action log type comprises:

collecting the action context; and generating the action log including the action context.

10. The computer-implemented method of claim 5, wherein the action is a first action and the action log is a first action log, wherein the method further comprises:

generating a second action log using the action log type for a second action of the action type;

wherein the first action log includes a first action context;

wherein the second action log includes a second action context different from the first action context.

11. The computer-implemented method of claim 5, wherein the action type is a first action type, the action is a first action, the action log type is a first action log type, and the action log is a first action log, wherein the method further comprises:

receiving data associated with a second action of a second action type, the second action type associated with editing the target object;

generating a second action log of a second action log type, the second action log being associated with the second action; and generating a log report including the first action log and the second action log.

12. A system for software action logging, the system comprising:

one or more memories having instructions stored;

one or more processors configured to execute the instructions and perform operations comprising:

accessing a target object of a target object type, the target object type comprising one or more object properties;

receiving data associated with an action of an action type, the action type comprising one or more action parameters and being associated with one or more action rules, the action type being associated with editing a target object of the target object type;

generating an action log of an action log type, the action log type comprising at least one of the one or more object properties and at least one of the one or more action parameters, the action log type further comprising an action context associated with the action of the action type, the action context comprising information associated with at least a second object type, wherein the second object type is different from the target object type, and wherein the action log includes a first link to the target object and a second link to a second object of the second object type; and executing code of a software application comprising the target object type, the action type, and the action log type, wherein the action type is a first data structure including a plurality of first data fields and the action log type is a second data structure including a plurality of second data fields, wherein the executing is configured to generate the action log of the action log type including the first link to the target object and the second link to the second object of the second object type.

13. The system of claim 12, wherein the editing a target object comprises creating the target object of the target object type, editing at least one object property of one or more object properties of the target object, or deleting the target object.

14. The system of claim 12, wherein the one or more action rules include a first action rule associated with a first user role, wherein the one or more action rules include a second action rule associated with a second user role, wherein the first action rule is different from the second action rule.

15. The system of claim 12, wherein the action log includes information associated with a second object of the second object type, wherein the action does not edit the second object.

16. The system of claim 12, wherein the generating an action log of an action log type comprises:

collecting the action context; and generating the action log including the action context.

17. The system of claim 12, wherein the action is a first action and the action log is a first action log, wherein the operations further comprises:

generating a second action log of the action log type for a second action of the action type;

wherein the first action log includes a first action context;

wherein the second action log includes a second action context different from the first action context.

18. The system of claim 12, wherein the action type is a first action type, the action is a first action, the action log type is a first action log type, and the action log is a first action log, wherein the operations further comprises:

receiving data associated with a second action of a second action type, the second action type associated with editing the target object;

generating a second action log of a second action log type, the second action log being associated with the second action; and generating a log report including the first action log and the second action log.

*    *    *    *    *